May 4, 1965  W. W. HAYWARD, JR  3,181,900
HOSE COUPLING HAVING WEDGED CLAMPING MEANS
Filed Sept. 19, 1963  2 Sheets-Sheet 2
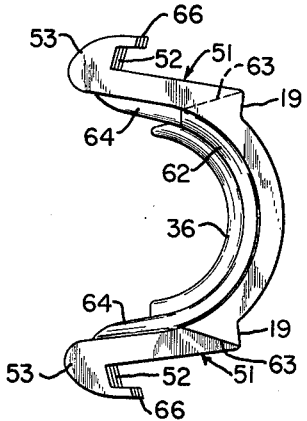
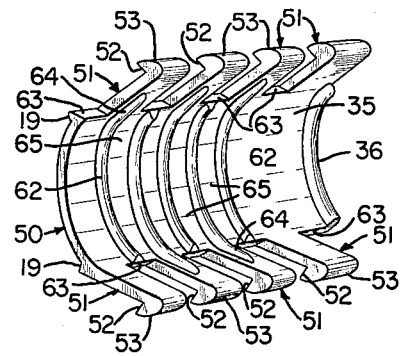
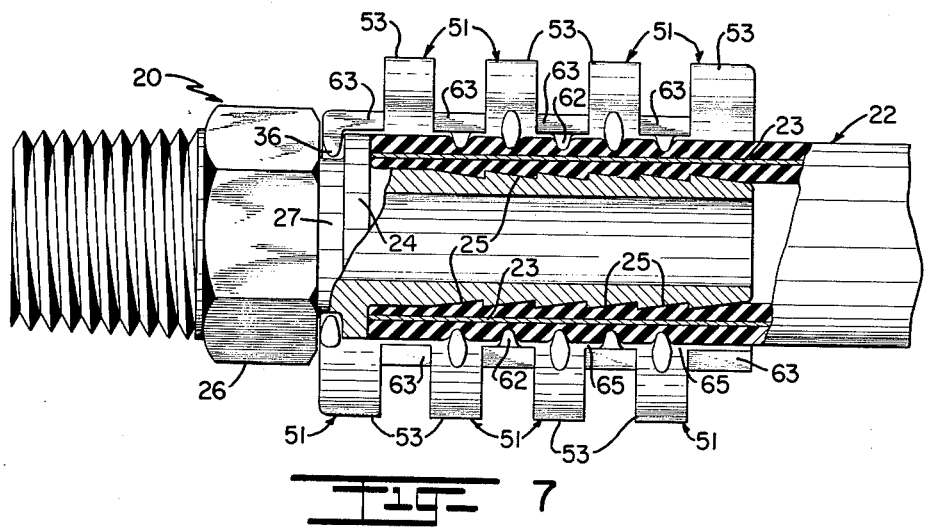
INVENTOR.
WALTER W. HAYWARD, JR.
BY Raymond Fink
ATTORNEY

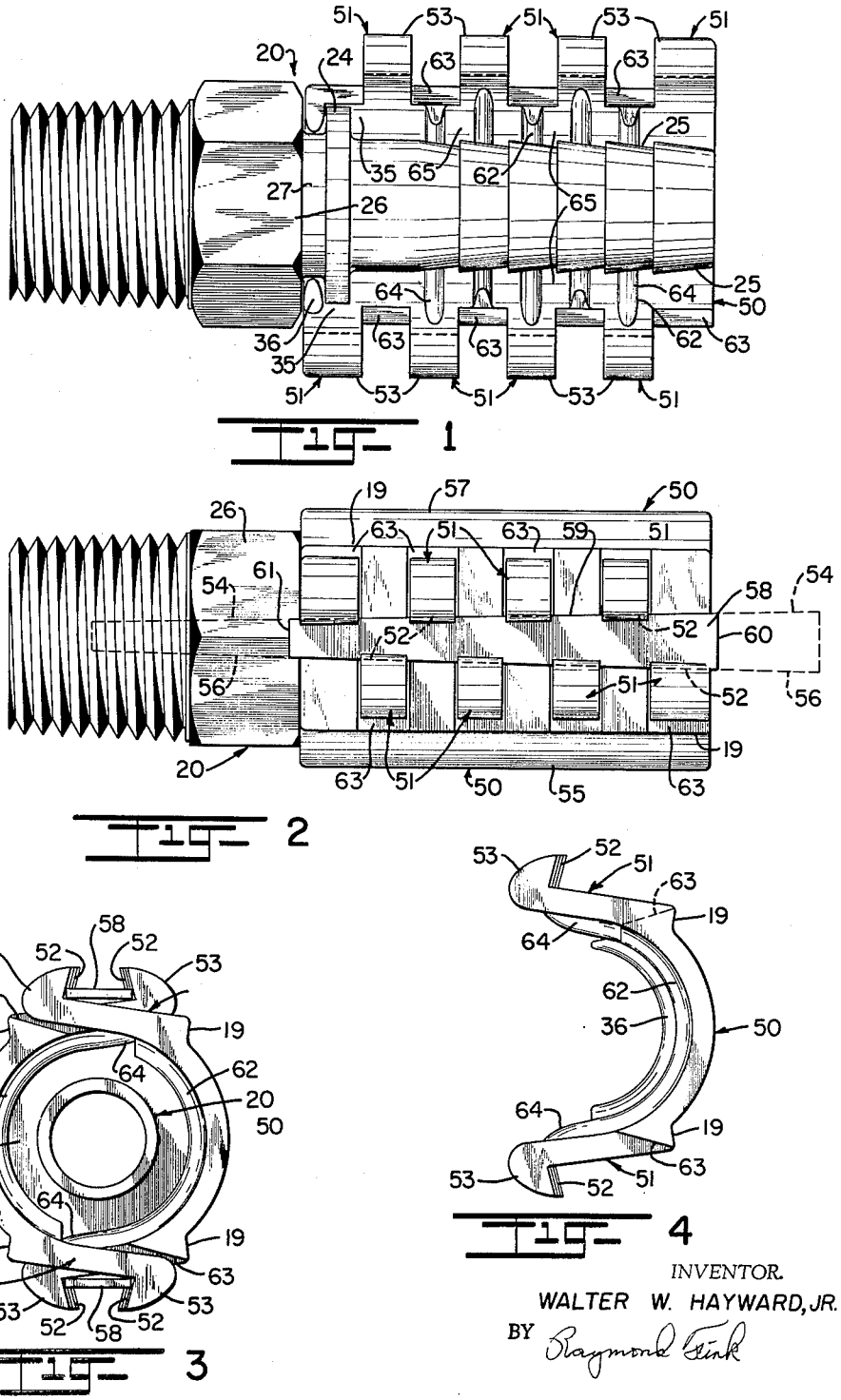

United States Patent Office 3,181,900
Patented May 4, 1965

3,181,900
HOSE COUPLING HAVING WEDGED
CLAMPING MEANS
Walter W. Hayward, Jr., Denver, Colo., assignor to The
Gates Rubber Company, Denver, Colo., a corporation
of Colorado
Filed Sept. 19, 1963, Ser. No. 312,822
8 Claims. (Cl. 285—243)

This application is a continuation-in-part of application Serial No. 153,359, filed November 20, 1961 and now abandoned.

This invention relates to a coupling assembly for connecting ends of resilient flexible hose members. More particularly this invention relates to a novel and improved reusable coupling which is characterized by increased gripping ability and is adapted for rapid assembly.

Various methods have previously been proposed for the connection or coupling of free ends of resilient hose members to each other. Often difficulties are presented with such connections when relatively high pressures are involved. Among the methods that have been proposed in the past is a split type ferrule whereby rigid sections are bolted to each other to completely encompass the circumferential outside surface of the free hose end. Generally this type of bolted coupling gives results that have certain disadvantages. Such a coupling must be laboriously bolted at alternate edge sections in order to apply force to close the ferrule halves around the hose end. Such a method of application is not only slow but awkward. In addition, localized pressure points are created in the area at which the bolt is secured to the coupling and provide for regions of possible failure. It would be desirable to eliminate localized pressure areas and have a uniform holding force along the entire axial length of the coupling.

An important feature, therefore, of the present invention resides in the simplification of the connection of the rigid ferrule members to one another. Not only is the connection of the coupling segments simplified, but the coupling connection can also be accomplished in a very rapid manner. Additionally, a more compact coupling is possible wherein a positive holding force is provided along the entire axial length of the coupling. In order to accomplish this objective, rigid arcuate members are formed in a manner such that they can be linked together to completely encompass the outside periphery of the resilient hose end. The lateral edges of the rigid members are provided with spaced apart projections or fingers that are disposed from one another in the axial direction such that complementary projections or fingers of the adjacent arcuate members will mesh and interlock with one another. Each such projection has a locking means by which the lateral edges of adjacent arcuate members can be locked together by means of a pin to completeley encompass the outer hose end. Additionally, the locking action is presented along the entire lateral end of each rigid member in order to distribute the forces.

The adjacent arcuate members can be locked together in a variety of ways by means of the locking pin. Thus a wedging action may be applied with a tapered pin in order to lock the lateral edges of adjacent members into an ever increasing tighter relation around the hose end. Additionally, the locking means are so constructed to provide for a mechanism for forcing the ferrule into a tightly encompassing locking position around the hose end and, additionally, to provide for an alignment adjustment in those cases when the initial encompassment around the hose end may encounter any degree of misalignment.

In order to facilitate the assembly, flat, essentially parallel, surfaces are provided on the outer peripheral surface of the adjacent arcuate member. Thus, to accomplish assembly with a minimum amount of effort, pressure may be applied against the opposing surfaces by means of a vise lock plier or bench vise or other force applying means. After the lateral edges are forced into a totally encompassing matching relation the locking pins may then be inserted to positively secure the member to one another around the periphery of the resilient hose end.

By means of the above mentioned feature, all external bolt connections are completely eliminated. Yet a great deal of pressure may be applied around the entire circumference in the hose end in a very expedient manner by means of the opposing flat surfaces. The unit is extremely compact and is capable of withstanding a great deal of pressure, once the locking means are applied. Additionally, it is obvious that positive attachment is provided along the entire axial length of the coupling thus eliminating any tendency to localize the attaching pressure. Because of the unique means of attachment accomplished with locking pins the members can be rapidly and easily engaged or disengaged by either insertion or withdrawal of the locking pin.

The coupling as encompassed by this invention is of the reusable type and is easily attached to either the internally reinforced type hose or to hose that is not reinforced. Such reinforcing means may either be of the fabric or metallic type of reinforcement. In addition, because of the nature of the assembly and because of the improved holding action along the entire axial length of the coupling, the end portion of the resilient hose member is not damaged or destroyed. Positive holding action may be accomplished without the necessity of skiving or removing rubber from the end portions of the hose member which is necessary with most other types of couplings. Since the hose end is not damaged or destroyed, and since no skiving is necessary with the coupling encompassed by this invention, the hose end remains intact and there is no likelihood of failure in the coupling area. The attachment of the present coupling is accomplished merely by insertion of locking pins after all the members are made to encompass the hose end. Mere removal of the pin from the adjacent segments allows for rapid and easy removal of the entire coupling from the hose end. All parts of the assembly may be reused and thus a completely reusable assembly is provided.

It is therefore one object of this invention to provide a reusable coupling that is easily assembled to the free end of a resilient hose member.

It is another object of this invention to provide a reusable coupling that has positive locking action along the entire axial length of the coupling.

It is still an additional object of this invention to provide a compact reusable coupling that is easily attached or removed from a resilient hose end, but yet one which will withstand a high working pressure.

Yet another object of this invention is to provide a reusable type coupling having meshing rib members on the circumferential inner surface of the ferrule such that no axial path is presented whereby leakage may occur at the coupled portion.

Still another object of this invention is to provide a reusable type coupling which may accommodate hose end sections in slightly varying dimensions.

It is still another object of this invention to provide a reusable coupling which will accommodate high working pressures, but yet one which is not destructive in nature to the coupled portion of the hose end thus minimizing likelihood of failure in this area.

Another object of this invention is to provide a reusable coupling capable of being installed on a hose end requiring no initial or preliminary preparation or skiving and yet one which will provide a completed assembly capable of withstanding very high working pressures.

This invention contemplates the use of a plurality of rigid arcuate members which have spaced apart projections or fingers on the lateral edge portion of the members. The projections are disposed from one another in an axial direction such that when the members are placed in a relationship to one another whereby the lateral edge portions of adjacent members come together, the alternate spaced apart projections fit together and mesh in an interlocking manner. The projections are formed in such a manner that adjacent lateral edges can be locked to one another. By such means the rigid arcuate members can be positioned so as to completely encompass the free ends of the resilient hose members. This ferrule section of the coupling is used in conjunction with a stem portion which is inserted into the free end of the hose member. Thus the stem portion is locked in a telescopic relation within the hose end and is positively held by the ferrule portion of the coupling. By means of such an arrangement a rigid coupling assembly has a ferrule which will accommodate working pressures ranging from that normally encounted by the most simple of the band type clamps to pressures encountered by the very massive type of couplings. By virtue of the ferrule and stem assembly, the hose ends can be coupled to one another.

Hose sections of slightly varying diameters can be accommodated by providing the locking means with a tapered side portion which acts as a wedge against correspondingly tapered edge portions on the projections. Thus as the locking means is inserted, an increasingly greater pressure forces the arcuate members into a tighter encompassment.

These same principles of my invention may be employed in a hose coupling having a substantially constant diameter. The tapered locking pin need be inserted only as far as is necessary to accommodate a given diameter hose end. If the gauge of the hose wall varies, the tapered pin need merely be inserted further to accommodate such variations. With a hose having a substantially constant diameter, such hose end can just as easily be accommodated by inserting the pin to such an extent as to force the ferrule portions to firmly encompass the hose end and to lock securely to the coupling stem.

Other objectives and advantages of the present invention will be apparent from the specification and claims which follow when considered in connection with the accompanying drawings.

FIGURE 1 shows a side sectional view of another preferred embodiment of the present invention wherein the relationship of the various components of the ferrule and stem portions are shown.

FIGURE 2 shows a side portion indicating the meshed relationship of another preferred embodiment and also the manner in which a locking pin engages the locking projections around the stem portion and the hose end section;

FIGURE 3 shows an end portion of the embodiment as shown in FIGURE 2;

FIGURE 4 shows one of the arcuate members according to the embodiment of FIGURE 2;

FIGURE 5 shows one of the arcuate members according to FIGURE 4, but with an overhanging portion on the locking projections in order to more securely engage the locking pin;

FIGURE 6 shows a perspective view of the arcuate members according to FIGURE 4; and FIGURE 7 shows a side sectional view indicating the relationship of the various components of the embodiment as it is encompassed on an end portion of a hose member. Also shown is the manner of locking the stem within the ferrule portion and the manner of securing the hose end portion around the stem portion and within the ferrule portion.

With more particular reference to the drawing there is shown in FIGURES 2 and 3 a preferred embodiment of the present invention. The invention broadly comprises rigid arcuate members 50 which are identical in structure. One of the arcuate members is more clearly and separately shown in FIGURES 4 and 6. Basically, the arcuate members contain a plurality of spaced apart projections 51 along the lateral edge of the members. The projections are spaced apart from one another substantially the same distance as are the widths of the projections in an axial direction. At any rate, the space between projections can be no less than such a width. It is therefore apparent that when the arcuate members are assembled into a cylindrical configuration the locking projections along the lateral edge of one member of the ferrule will mesh between the locking projections of an adjacent member.

In order to present a locking means the locking projections extend beyond the lateral edge of the rigid member. At the end portion of the locking projection a portion of the projections extend radially outward to present an enlarged portion of the projection on the rear surface of which is a reversed sloped face 52. Thus examination of the drawing indicates the additional radial extension 53. The opposing or reversed face 52 faces in the same direction as the convex portion of the rigid arcuate member, but is inclined to the normal of the tangent so that the included angle between the tangent and the inclined face is less than 90°. The series of reversed faces 52 present a continuous defined plane against which a force may be applied in order to lock the rigid arcuate member into an encompassing configuration.

So that an increasing or progressive locking force factor may be applied, it can be seen from examination of FIGURES 2 and 4 that succeeding reversed sloped faces on successive projections are radially offset from the preceding reversed sloped face; thus the planes defined by adjacent reversed sloped faces 52 of the projection members will converge in an axial direction toward each other. Examination of FIGURE 2 clearly indicates this relationship. The line 54 represents the plane defined by the reversed sloped faces of the rigid arcuate member 55. The line 56 represents the plane defined by the reversed sloped faces of the arcuate member 57. If the lines 54 and 56 were projected in an axial direction they would progressively converge toward one another and eventually intersect with each other. This relationship can additionally be visualized by viewing along the successive reversed sloped faces 52 in FIGURE 4.

A locking pin 58 can thus be utilized to engage the reversed sloped faces 52 of the locking projections 51. The locking pin 58 assumes the form of a flat tapered plane. The tapered surface 59 of the locking pin 58 engages the successive reversed sloped faces of the locking projections. The locking pin 58 will force the adjacent member into an increasingly tightening encompassing relationship as the tapered locking pin 58 is inserted further into an engaging relationship with the reversed sloped faces. In this case the locking pin 58 actually acts as a wedge forcing the arcuate members into a closer and tightening relationship. It is in this manner that the arcuate members 50 can be locked into an extremely tight encompassment around the outer periphery of the hose end. An additional feature of this design is that the locking pin 58 need be inserted only sufficiently to force the ferrule sections to encompass the particular diameter of the hose being coupled. It is evident that the locking action of the wedge shaped locking pin 58 will allow various diameters of hose to be accommodated. For this reason, the locking pin is initially of a longer length than is actually required to correspond to the length of the ferrule. Examination of FIGURE 2 indicates this relationship. Given therefore two different diameters of hose, the same components can be utilized to couple either diameter of hose. Assembly of the components around the smaller diameter hose will entail insertion of the locking pin 58 a greater distance into an engaging relation with the reversed sloped surface 52. Conversely, the larger diameter hose will allow the locking pin 58 to be inserted a shorter distance into engagement with the reversed sloped surfaces. At any rate, when the locking pins have been inserted sufficiently to force the arcuate members 50 into a tight encompassment around the hose end, the locking pin 58 may then be scored at a region near the axial ends of the ferrule shown by the lines 60 and 61 in FIGURE 2 and be broken off at the scored region.

Reference to FIGURE 6 will indicate another feature of this invention which allows the satisfactory operation of the coupling as embodied by this invention, for various diameters of hose. The inner circumference of each arcuate member contains a plurality of ribs 62 extending circumferentially around the ferrule segment in a region corresponding substantially to occurrences of locking projections 51. Such ribs extend at least to the lateral edge 63 of each arcuate member and extend even beyond the lateral edge onto the inner surface of the locking projections 51. Such extensions 64 of the ribs on the inner portion of the locking projections present a staggered termination of succeeding ribs. Tight encompassment of the ferrule around the hose end portion can be accomplished regardless of variation in diameter of the hose. By means of the extension of the rib portion there is never presented a path where an obstruction is not provided by means of a successive rib. This can be more vividly demonstrated by viewing one section of an arcuate member in an axial direction as shown in FIGURE 4. It can be seen that one rib 62 terminates at the region 63 corresponding to the lateral edge of the arcuate member. The next succeeding rib extends around the locking projection 51 and presents an extension 64 which is approximately ⅛ of the complete circumference of the ferrule. The staggered termination of the ribs on the projections prevents leakage of any fluid at the edge portions of the ferrule sections.

A close examination of the ferrule halves will indicate another feature of this invention. It will be seen from FIGURE 4 that if a radius is projected from the center of the ferrule half, that the faces 52 of the reversed sloped surfaces are at an inclination to the radius. The degree of inclination varies according to the particular size of the ferrule and the hose section that it is to encompass. Thus, for instance, for a ½" diameter hose, the inclination of the faces 52 to the radius is approximately 15°. Close examination will indicate why the reversed sloped faces 52 are set at an inclination to the radius. When the tapered pin 58 is inserted and encompassed by the series of reversed sloped faces of the ferrule halves, some method is necessary for retaining the tapered pin. It is true that the outward exertion of the ferrule halves will tend to tightly encompass the tapered pin. However, additional means are desirable to prevent the accidental dislodgment of the tapered pin 58 in a radial direction from the ferrule. Thus the tapered pin can be retained from displacement in a radially outward direction by the total confinement of a 30° surface varying radially inward against the pin. The radially outward convergence of the inclined faces 52 also provide for a mechanism of introducing alignment of the ferrule segments with one another even when the segments are initially meshed in an unaligned manner due to variations of the hose diameter. The inclined faces will firmly retain the tapered pins even while the pins are being inserted further between the locking surfaces. As the pins are inserted, the inclination of the faces 52 forces the segments to assume a cylindrical configuration thus in reality bringing the segments into substantially correct alignment around the hose end.

Reference to FIGURE 5 will indicate still another method to prevent radially outward displacement of the locking pin. It will be noted that this species of the ferrule contains tangential projections 66 which will prevent the locking pin from being displaced radially outward. Reference to FIGURE 3 indicates the encompassment of the locking pin 58 against the reversed sloped faces 52 of the first species. It will be seen that if the ferrule half is made to contain tangential projections 66 shown in FIGURE 5, then an open box will actually be formed into which the locking pin 58 can be inserted. It would be virtually impossible to dislodge the locking pin radially outward against the tangential projections 66. Practically speaking, however, it has been found that very seldom are such tangential projections 66 necessary. The inclination of the reversed sloped faces 52 to a radius has been found quite sufficient and effective in retaining the locking pin.

Because of the configuration and the relationship of the various components to another, the holding force of the pin is distributed along the entire axial length of the coupling. Such distribution along the entire axial length is possible with this type of interaction whereas such other types of couplings do not possess this advantage. Therefore, split ferrule couplings having bolting attaching actions would have stressed and forces concentrated at those areas at which the bolt is attached. Referring therefore to FIGURES 1 and 7, sections are shown indicating the interaction of the various assembled components of the coupling assembly. The hose end portion 22 is generally fabricated of a resilient rubber and rubber-like elastomer. It is to be understood that rubber-like elastomers would include all material and synthetic rubbers having elastomeric characteristics. Thus, in addition to natural rubber and SBR, other rubbers such as butyl, neoprene, butadiene/acrylonitrile and other synthetic rubbers are equally applicable when fabricated into resilient hose. Reinforcement 23, such as fabric or wire may be embedded within various layers of the fabricated hose. The coupling as contemplated by the present invention requires no preparation of the hose end prior to assembly. Unlike other types of coupling assemblies utilized, it is neither necessary nor desirable to skive off the outer layers of the resilient hose member. The stem 20 of the coupling is inserted within the free hose end portion until the end of the hose abuts against the collar 24 of the stem. It has been found to be beneficial to provide circumferential serrations 25 extending around the coupling stem. Thus, as the ferrule is forced into an embodiment around the hose end, the elastomer itself is deformed so as to completely fill the volume between the stem and the ferrule. Immediately between the collar 24 and the bolting surface 26 of the stem is an inwardly extending annular recess 27. The purpose of the annular recess will be subsequently explained.

Reference to FIGURE 7 will show that after the coupling assembly is complete, the raised portion 62 of the ribs will exert pressure inwardly along the resilient hose member. In so doing the pressure will slightly deform the hose member and will force the resilient material of the hose to fill the recess 65 between the raised ribs. In addition, the resilient hose will be further deformed such that the inner surface of the hose will tend to fill the area between the successive serrations 25 on the hose stem. Thus, it is seen that in reality the hose tends to become crimped. Such a crimping action makes it extremely difficult to pull the hose from the assembled coupling. In fact, extensive testing has indicated that in actual use danger of pulling out of the hose from the coupling is practically non-existent. On the contrary, regardless of the simplification and the ease of assembly, extensive testing indicates that this type of construction provides a far superior holding action than can be obtained by other types of reusable couplings.

An additional feature of the present invention is the automatically self-centering character of the stem as encompassed by the coupling. Examination of FIGURE 1 more clearly indicates this feature. The stem portion 20 is provided with a raised collar 24. Immediately adjacent to the collar portion and contained on the other side by the bolting portion 26 is an annular recess 27. The ferrule contains matching projections corresponding to the contour of the stem portion. Thus, the ferrule possesses a recess annulus 35 extending circumferentially on the inner surface of the rigid arcuate member. Immediately adjacent to recess annulus 35 is a flange 36 provided on the axial end of the ferrule. It can therefore be seen that these contours are spaced relative to one another in such a manner to fit and match the corresponding recesses and projections of the stem portion. Thus, the collar 24 of the stem fits within the recess 35 of the ferrule. On the other hand, the flange 36 of the ferrule fits within the annulus 27 of the stem.

Examination of the relative dimensions of the recesses and annuli indicates that the recess 35 which accommodates the collar 24 is of a greater distance axially than the width of the collar 24. Thus the stem may move relative to the ferrule in an axial direction. Further examination will reveal also that the radial dimension of the collar 24 is less than the radius of the inner surface of the recess 35. There exists a corresponding axial and radial difference in the dimensions of the recess 27 of the stem in the flange 36 of the ferrule. With such a degree of freedom for movement of the stem relative to the ferrule, the stem may be adjusted within the hose end portion not only in a radial direction but in an axial direction as it is encompassed by the ferrule portion. Therefore differences in wall gauge of the hose end portion are automatically accommodated by means of the self-centering action of the stem within the ferrule. Yet by virtue of the compressive action of the ferrule against the resilient hose member, and corresponding action against the stem portion an extremely tight and positive gripping action of the complete assembly is obtained.

Reference is now made to the substantially parallel surfaces 19 against which force may be applied in order to force the ferrule segments into a complete encompassment around the hose member. Frequently, it is necessary to apply a great deal of force in order to obtain maximum retaining pull of the ferrule around the hose. Previously, mention was made that the force exerted by the ribs 64 of the ferrule actually deformed the rubber so as to force the rubber on the outer surface of the hose and to fill the spaces 65. Additionally, the force deforms the inner surface of the hose and to force the rubber to fill the voids between the serrations 25 of the hose stem. The surfaces 19 may be substantially parallel or be slightly divergent from one another in a plane extending away from the axis on the ferrule. From practice it has been found that it is not critical whether the surfaces are divergent or in reality parallel. However, it has been found that it is undesirable for the surfaces not to converge toward one another in a direction radially outward from the axis of the ferrule. With convergent surfaces, if a great deal of pressure is necessary in order to force the ferrule segments into full encompassment, it is conceivable that pressure applied on the surfaces might force the entire assembly out of the gripping action of the vise or pliers.

Having thus described the invention with particular reference to a preferred form and certain modifications, it is obvious that thorough understanding of the invention will enable those skilled in the art to adapt various changes and other modifications in conjunction therewith without departing from the spirit and scope of the invention as defined by the claims appended thereto.

What is claimed is:

1. In a reusable coupling for connecting an end portion of a resilient hose wherein a tubular stem is inserted in a hose end portion and a ferrule surrounds and engages said end portion, said ferrule comprising: a plurality of rigid arcuate members; axially spaced apart projections on the lateral edge portions of said arcuate members, said projections having enlarged end portions and disposed from one another whereby said projections mesh with projections on adjacent members; circumferentially extending ribs on the inner surface of said arcuate members circumferentially extending onto said projections, said ribs having lateral edge portions displaced circumferentially from said lateral edge portions of adjacent ribs; means to receive pressure on the peripheral surface of adjacent rigid arcuate members to force said arcuate members into an encompassing relation around said resilient hose; radially inclined faces on the rear surface of said enlarged end portions of said projections said faces defining a plane which converges in a radially outward direction toward a plane defined by opposed radially inclined faces on adjacent meshing projections; freely insertable and removable locking pins engaging said inclined faces to align and lock said arcuate members in an encompassing relation around said hose.

2. A ferrule portion in accordance with claim 1 wherein successive radially inclined faces are radially offset from the next preceding face so as to define a plane which axially converges toward the plane defined by the inclined faces of the adjacent meshing projections and wherein said locking pin is complementarily tapered to engage each of said surfaces.

3. In a reusable coupling for connecting an end portion of a resilient hose wherein a tubular stem is inserted into the hose end and a portion of said stem extends beyond the hose end and wherein the exposed portion of the stem contains an annular recess into which a portion of a ferrule unit may be inserted, the combination comprising: a tubular stem; a ferrule unit having at least two rigid arcuate members; spaced apart locking projections on the lateral edge of said arcuate members, said locking projections having enlarged end portions and said locking projections axially disposed from one another to mesh between said projections of adjacent arcuate members; substantially parallel pressure receiving surfaces on the peripheral surface of adjacent arcuate members for forcing the ferrule into an encompassing relation around the hose end; radially inclined faces on the rear surface of said enlarged end portions of the locking projections, said inclined faces defining a plane which converges radially outward toward the plane defined by the inclined faces of the adjacent meshing locking projections; freely insertable and removable locking pins engaged by said inclined faces on the enlarged end portion of said locking projections, said locking pin extending axailly along the length of the ferrule portion; an annular flange projecting radially inward from said arcuate members engaging said annular recess of the stem; circumferentially extending ribs on the inner surface of said arcuate members circumferentially extending onto said projections, said ribs having lateral edge portions displaced circumferentially from said lateral edge portions of adjacent ribs.

4. The combination in a reusable coupling according to claim 3 in which the circumferentially extending ribs on the inner surfaces of said rigid members have edge portions which are situated on said projections and are displaced from one another along a length of an arc such that a baffled path is generated in an axial direction of the coupling by said edges of the ribs.

5. A ferrule in accordance with claim 4 wherein successive radially inclined surfaces on the rear surface of said enlarged end portions of said locking projections are axially offset from the next preceding adjacent inclined face so as to define a plane which is axially convergent with the plane defined by axially successive inclined faces of the adjacent meshing projections and wherein said locking pin is complementarily tapered to engage said axially convergent inclined surfaces.

6. A reusable coupling according to claim 3 in which the stem portion has circumferentially extending serrations on the outer surface of said stem said serrations on said stem and said ribs on the inner surface of said arcuate members disposed such that the resilient hose will be forced to be deformed and fill the recesses between said ribs and said serrations.

7. In a coupling device to be secured to an end portion of a resilient hose having a tubular coupling stem inserted into said hose, and a coupling ferrule surrounding and engaging said hose end portion, said ferrule comprising: a plurality of rigid arcuate members having an annular flange projecting radially inward; spaced apart projections on the lateral edge portions of said arcuate members, said projections having enlarged end portions and axially disposed from one another whereby the projections of the adjacent arcuate members are engaged in meshing relation with said spaced apart projections; pressure receiving means on the peripheral surface of adjacent arcuate members to force said arcuate members into an encompassing relation around said hose; circumferentially extending ribs on the inner surface of said arcuate members circumferentially extending onto said projections, said ribs having lateral edge portions circumferentially offset from the edge portions of adjacent circumferential ribs; inclined locking faces on the rear surface of said enlarged end portion of successive projections defining a plane which is convergent radially outward from a plane defined by the inclined locking faces on the rear surface of said enlarged end portions of adjacent arcuate members, said locking faces of axially successive projections radially offset defining opposing planes axially convergent relative to one another when meshed with said projections of an adjacent arcuate member; freely insertable and removable pins tapered complementary to said opposed axially extending convergent planes defined by said inclined surfaces, said pins engaging said inclined locking faces to align and lock said arcuate members into an encompassing relation around said hose.

8. A reusable coupling according to claim 7 in which the circumferentially extending ribs on the inner surfaces of said rigid members have edge portions on said projections and are displaced from one another along a length of an arc such that a baffled path is generated in an axial direction of the coupling by said edges of the ribs.

References Cited by the Examiner
UNITED STATES PATENTS

| 41,630 | 2/64 | McBurney | 285—252 |
| 142,388 | 9/73 | Goble | 285—419 |
| 576,119 | 2/97 | Hess | 285—197 |
| 1,076,851 | 10/13 | Welshans | 285—421 |
| 1,505,255 | 8/24 | Gold | 285—253 |
| 2,512,741 | 6/50 | Goodall | 285—253 |
| 2,649,314 | 8/53 | Richardson | 285—420 |
| 2,880,761 | 4/59 | Peter | 285—419 |

FOREIGN PATENTS

| 1,021,311 | 12/57 | Germany. |
| 177,939 | 4/22 | Great Britain. |

CARL W. TOMLIN, *Primary Examiner.*